US009489778B2

(12) United States Patent
Hering

(10) Patent No.: US 9,489,778 B2
(45) Date of Patent: Nov. 8, 2016

(54) METHOD AND SYSTEM FOR ALERTING A DRIVER TO A CONDITION OF A VEHICLE

(75) Inventor: Carl J. Hering, Farmington Hills, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 1433 days.

(21) Appl. No.: 12/844,566

(22) Filed: Jul. 27, 2010

(65) Prior Publication Data

US 2012/0029763 A1 Feb. 2, 2012

(51) Int. Cl.
*G06F 7/00* (2006.01)
*B60Q 1/00* (2006.01)
*G07C 5/00* (2006.01)

(52) U.S. Cl.
CPC .................................... *G07C 5/008* (2013.01)

(58) Field of Classification Search
CPC ...................................................... G07C 5/008
USPC ............................................................ 701/32
See application file for complete search history.

(56) References Cited

U.S. PATENT DOCUMENTS

| | | | | |
|---|---|---|---|---|
| 6,933,842 | B2 | 8/2005 | Oesterling et al. | |
| 7,010,289 | B2 | 3/2006 | Jijina et al. | |
| 7,272,475 | B2 | 9/2007 | Gawlik et al. | |
| 7,286,047 | B2 | 10/2007 | Oesterling et al. | |
| 7,522,980 | B2 | 4/2009 | Watkins et al. | |
| 7,627,406 | B2 | 12/2009 | Wang et al. | |
| 7,908,051 | B2 * | 3/2011 | Oesterling | 701/29.5 |
| 2008/0027604 | A1 | 1/2008 | Oesterling | |
| 2009/0177351 | A1 | 7/2009 | Watkins et al. | |
| 2011/0153148 | A1 * | 6/2011 | Edwards et al. | 701/30 |

* cited by examiner

*Primary Examiner* — Hiep V Nguyen
(74) *Attorney, Agent, or Firm* — Lorenz & Kopf LLP

(57) ABSTRACT

A system for alerting a driver to a condition of a vehicle is disclosed herein. The system includes, but is not limited to, a telematics unit that is mounted to the vehicle and that is configured to receive a fault notification from a subsystem on board the vehicle when a fault in the subsystem is detected. A call center is remotely located from the vehicle and is communicatively connected to the telematics unit. The telematics unit is configured to provide the fault notification to the call center. The call center is configured to initiate communication with the driver if the fault falls within a first category of faults and to set a trigger in the telematics unit to initiate contact with the call center upon a next ignition actuation of the vehicle if the fault falls within a second category of faults.

12 Claims, 4 Drawing Sheets

METHOD AND SYSTEM FOR ALERTING A DRIVER TO A CONDITION OF A VEHICLE

TECHNICAL FIELD

The technical field generally relates to vehicles, and more particularly relates to methods and systems for alerting a driver to a condition of a vehicle.

BACKGROUND

The powertrain on a modern vehicle is a complex arrangement of machinery and electronics. Because of this complexity, a modern powertrain is frequently connected to a monitoring system to detect faults, errors and/or malfunctions (hereinafter, "faults") during powertrain operations for the purpose of alerting the driver of the vehicle to the existence of the fault. If a fault is detected, a fault code, sometimes called a Diagnostic Trouble Code ("DTC"), will be recorded in the monitoring system. The fault code corresponds to the type of fault that is detected and is later retrieved and used by a technician to diagnose and repair the powertrain.

Faults are typically categorized into one of two categories: A-code faults and B-code faults. The A or B designation is typically included in the fault code that is recorded at the monitoring system. A-code faults generally have more urgency because they carry a higher risk that powertrain damage may result if they are not immediately addressed. B-code faults are faults that have less urgency associated with them and are less likely to immediately result in damage to a powertrain component.

To alert a driver to the existence of a fault, a notification system is typically mounted onboard the vehicle. The notification system will illuminate a warning light, commonly referred to as a Malfunction Indicator Light ("MIL") or it will illuminate some other warning that is visible to the driver. Because of the differences in their respective urgencies, A-code faults are reported to the driver sooner than B-code faults.

If the fault is an A-code fault, the monitoring system will record the fault and instruct the notification system to illuminate the warning light after the first occurrence of the fault. When the fault is a B-code fault, however, the monitoring system will record the fault code, but will not immediately instruct the notification system to illuminate the warning light. Rather, the monitoring system is configured to wait until the next ignition actuation of the vehicle (i.e., the next time that the vehicle is turned on) to verify that the fault remains present. If, at that time, the B-code fault is detected again, then the monitoring system will instruct the notification system to illuminate the warning light. A new fault code will not be recorded at the monitoring system after the second occurrence of the fault. Rather, the status of the existing fault code that is recorded at the monitoring system will change from a "pending" status to a "notify" status and the monitoring system will then instruct the notification system to illuminate the warning light.

When the notification system illuminates the warning light, it may provide a predetermined message to the driver, such as "Service Engine Soon", or "Turn Off Engine Now", but it is otherwise not able to provide any further explanation to the driver about the vehicle's condition. Additional information about the fault, however, is available at the monitoring system and can be provided to the driver immediately via a telematics service. Telematics services are those services that are provided by a remotely located call center to a vehicle equipped with a telematics unit. The call center and the telematics unit communicate via an automatic and/or on-demand communications link that connects the call center to the telematics unit.

The monitoring system on the vehicle is configured to provide notification of the occurrence of a fault to the telematics unit each time that a fault code is recorded in the monitoring system, regardless of whether the fault is an A-code type of fault or a B-code type of fault. The telematics unit is configured to then initiate a call to the call center when it receives the notification of the fault. A human advisor or automaton at the call center can then initiate contact with the driver of the vehicle to offer assistance in diagnosing the fault. (Communication from the call center to the vehicle is not restricted to verbal communication. An automaton in lieu of a human advisor may send messages to the vehicle and the vehicle may render the messages as text on a simple display, incorporate graphics along with a message to be rendered on a multimedia display, or may deliver aural, textural or graphic data to be rendered simultaneously on a vehicle multimedia display.)

If communication is initiated each time that a fault is recorded at the monitoring system and the telematics unit is notified, then in instances where the fault is a B-code type of fault, the call center will contact the driver to address the fault when the warning light is not illuminated and the driver is unaware of the fault. Additionally, if the B-code type fault is detected again after the next ignition actuation, the warning light will come on, but there will be no communication initiated by the call center to assist the driver because the second occurrence does not cause recordation of the fault at the monitoring unit and therefore no notice will be provided to the telematics unit.

SUMMARY

Multiple examples of a method and a system for alerting a driver to a condition of a vehicle are disclosed herein.

In a first example, the system includes, but is not limited to, a telematics unit that is mounted to the vehicle and that is configured to receive a fault notification from a subsystem on board the vehicle when a fault in the subsystem is detected. The system further includes a call center that is remotely located from the vehicle and that is communicatively connected to the telematics unit. The telematics unit is configured to provide the fault notification to the call center. The call center is configured to initiate communication with the driver if the fault falls within a first category of faults and to set a trigger in the telematics unit to initiate contact with the call center upon a next ignition actuation of the vehicle if the fault falls within a second category of faults.

In another example, the vehicle has a vehicle subsystem, a fault detection monitor configured to detect a fault in the vehicle subsystem, and a fault indicator communicatively connected to the fault detection monitor. The fault indicator is configured to provide a fault indication to the driver upon a first occurrence of the fault if the fault falls within a first category of faults, and to provide the fault indication to the driver after multiple occurrences of the fault if the fault falls within a second category of faults. In this example, the system includes, but is not limited to a telematics unit that is mounted to the vehicle and that is configured to receive a fault notification from the fault detection monitor. The system also includes a call center that is remotely located from the vehicle. The call center is communicatively coupled with the telematics unit. The telematics unit is configured to provide the fault notification to the call center when the telematics unit receives the fault notification from the fault detection monitor. The call center is configured to determine whether the fault indication has been provided to the driver when the call center receives the fault notification from the telematics unit. The call center is further configured to initiate communication with the driver if the fault indication has been provided to the driver. The call center is still further configured to set a trigger in the telematics unit that will cause the telematics unit to initiate contact with the call center upon a next ignition actuation of the vehicle if the fault indication has not been provided to the driver.

In another example, the vehicle has a vehicle subsystem, a fault detection monitor configured to detect a fault in the vehicle subsystem, and a fault indicator that is communicatively connected to the fault detection monitor. The fault indicator is configured to provide a fault indication to the driver upon a first occurrence of the fault if the fault falls within a first category of faults, and to provide the fault indication to the driver after multiple occurrences of the fault if the fault falls within a second category of faults. In this example, a method for alerting a driver to a condition of a vehicle includes receiving a fault notification at a telematics unit mounted to the vehicle, providing the fault notification to a call center, the call center being remotely located from the vehicle, determining whether the fault indication has been provided to the driver, initiating communication between the call center and the driver if the fault indication has been provided to the driver, and setting a trigger at the telematics unit if the fault indication has not been provided to the driver, the trigger being configured to prompt the telematics unit to contact the call center upon the next ignition actuation of the vehicle.

DESCRIPTION OF THE DRAWINGS

One or more examples will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

Figure 1:
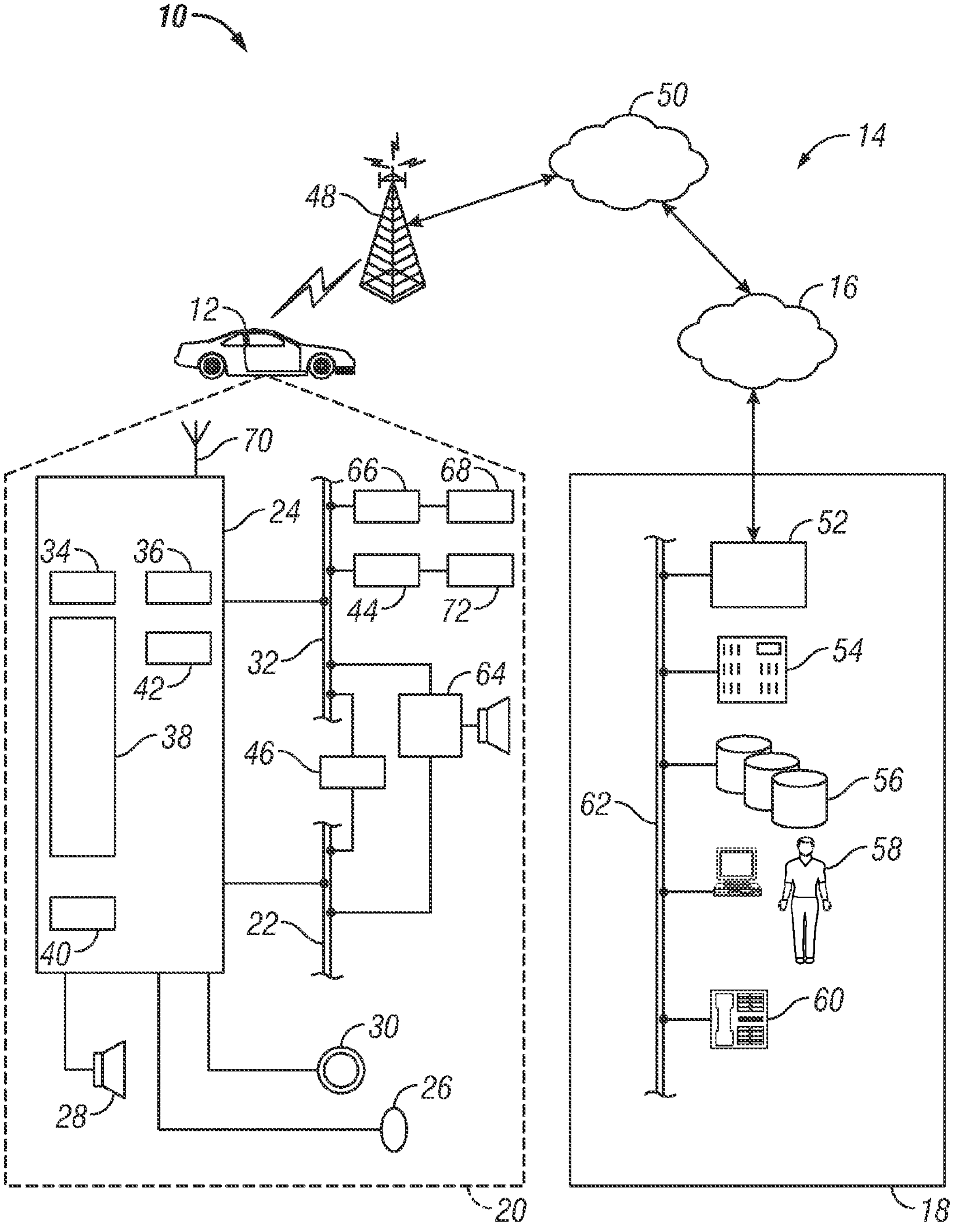
FIG. 1 is a schematic view illustrating a non-limiting example of a system for alerting a driver to a condition of a vehicle.

With reference to FIG. 1, there is shown a non-limiting example of a system 10 that may be used to alert a driver to a condition of a vehicle or to implement methods for doing the same. System 10 generally includes a vehicle 12, a wireless carrier system 14, a land network 16 and a call center 18. It should be appreciated that the overall architecture, setup and operation, as well as the individual components of the illustrated system are merely exemplary and that differently configured systems may also be utilized to implement the examples of the system and method disclosed herein. Thus, the following paragraphs, which provide a brief overview of the illustrated system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

The telematics unit 24 may provide various services including: turn-by-turn directions and other navigation-related services provided in conjunction with the GPS chipset/component 42; airbag deployment notification and other emergency or roadside assistance-related services provided in connection with various crash and/or collision sensor interface modules 66 and collision sensors 68 located throughout the vehicle; and/or infotainment-related services where music, Internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. In order to enable successful data transmission over the voice channel, wireless modem 36 applies some type of encoding or modulation to convert the digital data so that it can be communicated through a vocoder or speech codec incorporated in the cellular chipset/component 34. Any suitable encoding or modulation technique that provides an acceptable data rate and bit error can be used with the present examples. Dual mode antenna 70 services the GPS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14. For example, a base station and a cell tower could be co-located at the same site or they could be remotely located, and a single base station could be coupled to various cell towers or various base stations could be coupled with a single MSC, to list but a few of the possible arrangements. A speech codec or vocoder may be incorporated in one or more of the base stations, but depending on the particular architecture of the wireless network, it could be incorporated within a Mobile Switching Center or some other network components as well.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either the live advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a manned call center 18, it will be appreciated that the call center 18 can be any central or remote facility, manned or unmanned, mobile or fixed, to or from which it is desirable to exchange voice and data.

Figure 2:
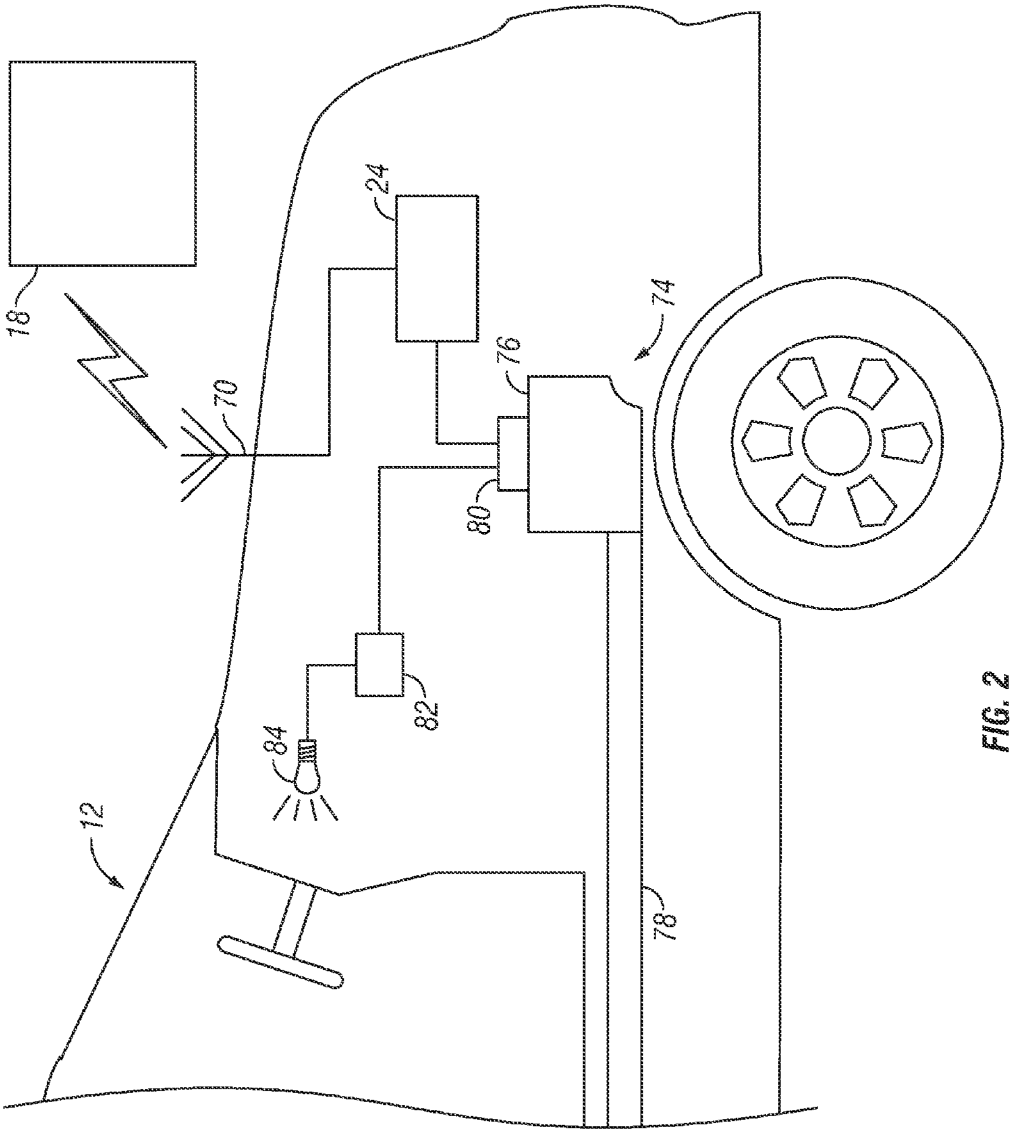
FIG. 2 is a fragmented simplified view of a vehicle configured to utilize the system of FIG. 1.

FIG. 2 is a fragmented simplified view of vehicle 12. Vehicle 12 includes a subsystem 74 comprising a powertrain that includes an internal combustion engine 76 for generating torque and a transmission 78 for transmitting the torque to the wheels of vehicle 12. It should be understood that the depiction of a vehicle powered by an internal combustion engine is exemplary only and is not intended to be limiting. Other compatible propulsion systems include hybrid electric propulsion systems, fuel cell propulsion systems, and/or pure electric propulsion systems. Although the context for the following discussion relates to the powertrain and to the detection and notification of faults arising during operation of the powertrain, it should be understood that the teachings contained herein are not limited to use with a vehicle powertrain. Rather, the teachings herein are compatible for use with any other system or subsystem onboard a vehicle for which it is desirable to provide notification and assistance to a driver of the vehicle when faults in such subsystem are detected.

A fault detection monitor 80 is mounted to subsystem 74 and is configured to monitor the various components of subsystem 74 during operation and to detect faults in subsystem 74 when they arise. In the illustrated example, fault detection monitor 80 is mounted directly to subsystem 74. In other examples, fault detection monitor 80 may be mounted remotely from subsystem 74 and may include one or more probes, sensors, and/or other devices that extend from fault detection monitor via wires and/or electric leads and that are configured to attach or connect to the various components of subsystem 74 to monitor subsystem 74 for faults. In still other examples, fault detection monitor 80 may comprise a plurality of discrete monitors, each configured to monitor a different component of subsystem 74 and which operate either independently or cooperatively and through a central controller.

Fault detection monitor 80 may include a processor, circuitry, or may otherwise be configured to operate in accordance with programming. In some examples, fault detection monitor 80 may be a central processing unit controlling multiple functions for vehicle 12 while in other examples, fault detection monitor 80 may be a stand-alone, single purpose component.

In the illustrated example, fault detection monitor 80 is configured to detect faults in subsystem 74 and to assign and/or record a fault code corresponding to each fault detected. The fault code may later be retrieved from fault detection monitor 80 by a technician making repairs to subsystem 74.

A fault indicator 82 is mounted to vehicle 12. Fault indicator 82 is communicatively coupled to, and is configured to receive instructions from, fault detection monitor 80. Fault indicator 82 is configured to provide a driver of vehicle 12 with an indication that a fault has been detected. In the illustrated example, fault indicator 82 is configured to actuate a warning light 84 that is mounted within an instrument panel. When illuminated, warning light 84 will be visible to a driver of vehicle 12. In some examples, warning light 84 may include a warning message. In other examples, fault indicator 82 may cause a warning message to appear on a view screen mounted in the passenger compartment of vehicle 12. In other examples, fault indicator 82 may include a speaker and may be configured to produce an aural alarm, siren, or verbal message audible to the driver of vehicle 12. In other examples, fault indicator 82 may be any combination of the foregoing, or may include other components configured and/or arranged to provide a driver of vehicle 12 with notification of the detected fault.

The faults that may arise during operation of subsystem 74 fall into one of two categories, A-code type faults and B-code type faults, as discussed in the Background section above. In some examples, fault detection monitor 80 may be configured to determine whether a detected fault is either an A-code type fault or a B-code type fault while in other examples, the category into which a particular fault will fall may be predetermined. When an A-code type of fault occurs, fault detection monitor 80 is configured to immediately provide instructions to fault indicator 82 to alert the vehicle driver about the existence of the fault. When a B-code type of fault occurs, fault detection monitor 80 is configured to wait until the next ignition actuation occurs and if the same fault is detected again, then fault detection monitor 80 will provide the instructions to fault indicator 82 to alert the vehicle driver about the existence of the fault. In either case, the fault code associated with the fault is recorded at fault detection monitor 80 at the time when the fault is first detected, regardless of whether fault detection monitor 80 instructs fault indicator 82 to provide an indication to the driver.

Fault detection monitor 80 is further configured to provide a fault notification to telematics unit 24 whenever a fault code is recorded at fault detection monitor 80. In some examples, the fault notification may include all available information about the fault, including the fault code associated with the fault. While in other examples, the fault notification may simply comprise notice that a fault in subsystem 74 has occurred. The fault notification is provided to telematics unit 24 only once, when the fault code is first recorded at fault detection monitor 80. Notification of additional occurrences of the fault will not be provided to telematics unit 24 during subsequent ignition actuations of vehicle 12 unless the fault code has been cleared from fault detection monitor 80.

Telematics unit 24 is configured to contact call center 18 and to provide fault notification to call center 18 each time that telematics unit 24 receives the fault notification from fault detection monitor 80. Such contact between telematics unit 24 and call center 18 may be undertaken without any awareness by the driver of vehicle 12 and may be accomplished through the exchange of data communications between telematics unit 24 and various components at call center 18.

Figure 3:
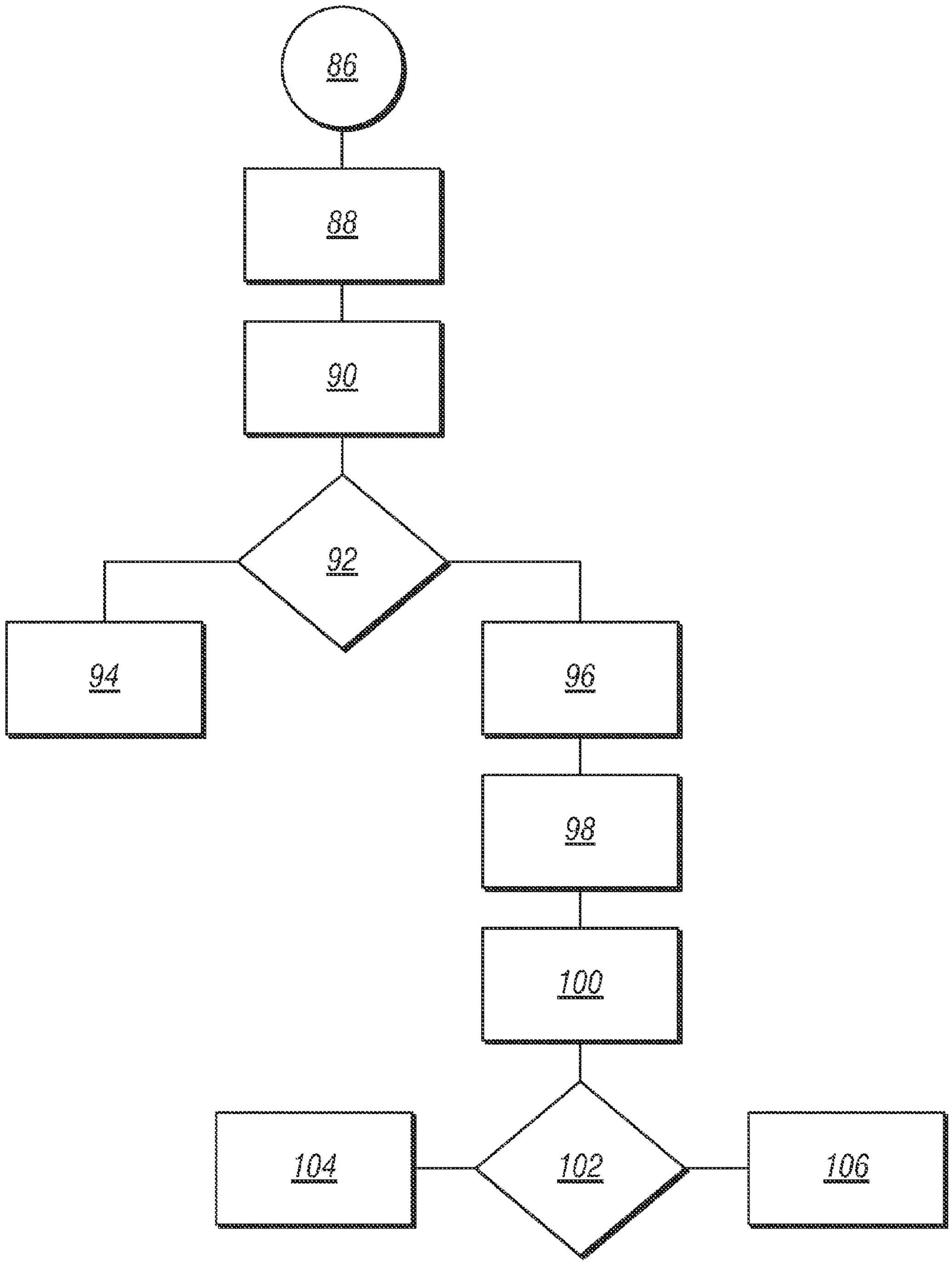
FIG. 3 is a flow chart illustrating an example of how the system of FIG. 1 may be used to alert a driver to a condition of a vehicle.

FIG. 3 is a flow chart illustrating an example of how the system of FIG. 1 may be used to alert a driver to a condition of a vehicle. More specifically, FIG. 3 illustrates how the system of FIG. 1 can be utilized to help a driver of vehicle 12 to diagnose faults that are detected in subsystem 74 immediately. Such information will help a driver to determine what course of action to follow such as whether to complete a trip or to head immediately to a vehicle service center.

With continuing reference to FIGS. 1 and 2, at node 86, a fault is detected by fault detection monitor 80. As discussed above, fault detection monitor 80 will record the fault code and, depending upon whether the fault is an A-code type of fault or a B-code type of fault, will either instruct fault indicator 82 to provide an indication of the fault to the driver of vehicle 12, or it will wait for a second occurrence of the fault occurring upon the next ignition actuation. In addition, fault detection monitor 80 will also provide notification of the fault to telematics unit 24.

At node 88, telematics unit 24 receives notification of the fault from fault detection monitor 80. Telematics unit 24 is configured to immediately provide notification of the fault to call center 18.

At node 90, call center 18 receives notification of the fault from telematics unit 24. Such notification may include the fault code itself or only a notification that a fault of some sort pertaining to subsystem 74 has occurred.

At node 92, call center 18 is configured to determine whether the fault code is an A-code type fault or a B-code type fault. Call center 18 may make this determination in a wide variety of ways. For example, the fault code itself may include an indication of whether the fault is an A-code fault or a B-code fault. Accordingly, when/if telematics unit 24 provides the fault code to call center 18, then call center 18 can make this determination from the information provided by telematics unit 24. If the fault code is not provided by telematics unit 24, or if the fault code does not contain an indication of whether the fault is an A-code type fault or a B-code type fault, then call center 18 may be configured to query vehicle 12, via telematics unit 24, to determine which category the fault falls within. For example, call center 18 may send a query directly to fault detection monitor 80 to ascertain whether the fault is an A-code type fault or a B-code type fault. In another example, call center 18 may send a query to fault detection monitor 80 to ascertain whether fault detection monitor 80 provided instructions to fault indicator 82 to provide an indication of the fault to the driver of vehicle 12. In still other examples, call center 18 may query fault indicator 82 directly to determine if warning light 84 is illuminated or if some other indication has been provided to the driver of vehicle 12.

If call center 18 determines that the fault is an A-code type fault and/or that notification of the fault has been provided to the driver of vehicle 12, then at node 94, call center 18 will initiate communication between advisor 58 and the driver of vehicle 12 to offer assistance to the driver in diagnosing the fault. At this time, advisor 58 may provide a variety of diagnostic services and may also provide other types of assistance such as locating a nearest service center.

If, however, call center 18 determines that notification of the fault has not been provided to the driver of vehicle 12 and/or if call center 18 has determined that the fault is a B-code type fault, then at node 96, call center 18 will set a trigger in telematics unit 24 that will cause telematics unit 24 to automatically initiate contact with call center 18 upon the next ignition actuation of vehicle 12. Triggers may be represented as a bit set or reset in a register or telematics unit memory. Upon actuation of the vehicle the bit is examined, and depending on the state of the bit, communication is initiated with the call center. For example, if a trigger bit is set to 1, then a call is initiated and the bit is reset upon successful initiation and completion of the call. In some examples, call center 18 may also assign an identification number to the fault and may include the identification number in the trigger. Call center 18 can instruct telematics unit 24 to provide the identification number to call center 18 when telematics unit 24 next contacts call center 18. When provided, the identification number can guide call center 18 in querying vehicle 12.

At node 98, the next ignition actuation of vehicle 12 is detected. As discussed above with reference to FIG. 1, telematics unit 24 is connected to vehicle bus 32 and can be alerted to the occurrence of ignition actuations via vehicle bus 32.

At node 100, after the next ignition actuation has been detected, telematics unit 24 will be prompted by the trigger to initiate contact with call center 18. If an identification number has been included with the trigger, then telematics unit 24 will provide the identification number to assist call center 18.

At node 102, after call center 18 has been contacted by telematics unit 24 and has received the identification number, call center 18 will perform a diagnostic investigation of vehicle 12 via telematics unit 24 to determine whether fault indicator 82 has been actuated. This may be accomplished through a query of fault detection monitor 80 which would have a record indicating whether or not it had provided actuation instructions to fault indicator 82. Alternatively, call center 18 may query fault indicator 82 directly to ascertain whether warning light 84 is illuminated or whether fault indicator 82 has otherwise provided an indication of the fault to a driver of vehicle 12.

If fault indicator 82 has been actuated, then at node 104, call center 18 will initiate communications between advisor 58 and a driver of vehicle 12. If fault indicator 82 has not been actuated, then at node 106, call center 18 will cancel, delete, or otherwise render null the trigger in telematics unit 24.

Figure 4:
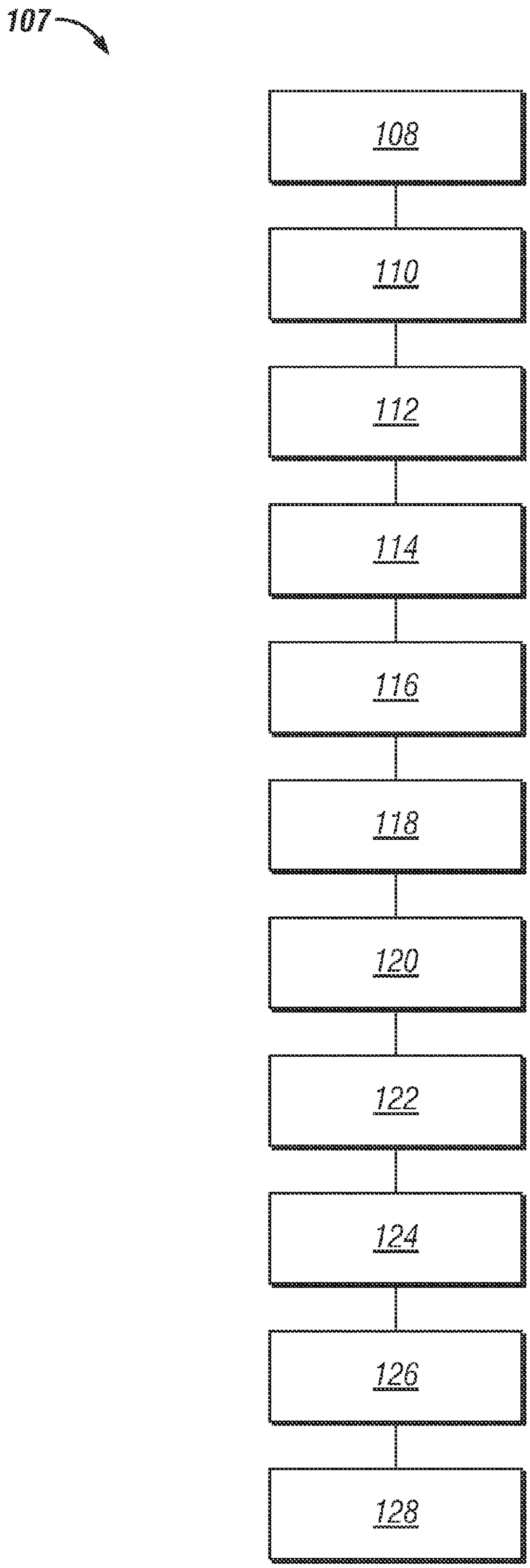
FIG. 4 is a block diagram illustrating an example of a method for alerting a driver to a condition of a vehicle.

FIG. 4 is a block diagram illustrating an example of a method 107 for alerting a driver to a condition of a vehicle. In this example, the vehicle has a vehicle subsystem, a fault detection monitor that is configured to detect a fault in the vehicle subsystem, and a fault indicator that is communicatively connected to the fault detection monitor. The fault indicator is configured to provide a fault indication to the driver upon the first occurrence of the fault if the fault is an A-code type of fault. The fault indicator provides the fault indication to the driver after multiple occurrences of the fault if the fault is a B-code type of fault.

At block 108, notification of the fault in the vehicle subsystem is provided to telematics unit 24. This fault notification may be provided by the fault detection monitor, the fault indicator, or by any other apparatus on the vehicle.

At block 110, telematics unit 24 provides notification of the fault to call center 18. This notification may include all or less than all of the information provided to telematics unit 24.

At block 112, call center 18 determines whether a fault indication relating to the fault has been provided to the driver. Call center 18 may make this determination through a query sent to the fault detection monitor, to the fault indicator, or to any other apparatus on board vehicle 12 that is notified of the fault.

At block 114, call center 18 will initiate communications with the driver of vehicle 12 if it is determined that the driver has received an indication that the fault has occurred. During such communications, advisor 58 may offer the driver a variety of assistance, including, but not limited to, the performance of a vehicle diagnostic examination to determine the cause of the fault.

At block 116, call center 18 will set a trigger in telematics unit 24 that will prompt telematics unit 24 to contact call center 18 after the next ignition actuation of vehicle 12. At block 118, call center 18 may embed an identification number in the trigger.

At block 120, telematics unit 24 will automatically initiate contact with call center 18 after the next vehicle ignition and at block 122, telematics unit 24 will provide call center 18 with the identification number.

At block 124, call center 18 determines if the fault indicator has been actuated. If it has, then at block 126, call center 18 will initiate communication with the driver of vehicle 12. If it has not, then at block 128, call center 18 will cancel the trigger in telematics unit 24.

While at least one example has been presented in the foregoing detailed description, it should be appreciated that a vast number of variations exist. It should also be appreciated that the examples shown and described are not intended to limit the scope, applicability, or configuration in any way. Rather, the foregoing detailed description will provide those skilled in the art with a convenient road map for implementing the examples discussed herein. It should be understood that various changes can be made in the function and arrangement of elements without departing from the scope as set forth in the appended claims and the legal equivalents thereof.

What is claimed is:

1. A system for alerting a driver to a condition of a vehicle, the vehicle having a vehicle subsystem, a fault detection monitor configured to detect a fault in the vehicle subsystem, and a fault indicator communicatively connected to the fault detection monitor and configured to provide a fault indication to the driver upon a first occurrence of the fault if the fault falls within a first category of faults, and to provide the fault indication to the driver after multiple occurrences of the fault if the fault falls within a second category of faults, the system comprising:

a telematics unit mounted to the vehicle and configured to receive a fault notification from the fault detection monitor; and a call center remotely located from the vehicle, the call center being communicatively coupled with the telematics unit, wherein the telematics unit is configured to provide the fault notification to the call center when the telematics unit receives the fault notification from the fault detection monitor, and wherein the call center is configured to:

determine whether the fault indication has been provided to the driver when the call center receives the fault notification from the telematics unit, initiate communication with the driver if the fault indication has been provided to the driver, and set a trigger in the telematics unit that will cause the telematics unit to initiate contact with the call center upon a next ignition actuation of the vehicle if the fault indication has not been provided to the driver.

2. The system of claim 1, wherein the call center is further configured to:

determine whether the fault indication has been provided to the driver after the next ignition actuation of the vehicle; and initiate communication with the driver if the fault indication has been provided to the driver after the next ignition actuation of the vehicle.

3. The system of claim 2, wherein the call center is further configured to cancel the trigger in the telematics unit if the fault indication has not been provided to the driver after the next ignition actuation of the vehicle.

4. The system of claim 1, wherein the call center is further configured to include an identification number in the trigger that relates to the fault and wherein the telematics unit is further configured to provide the identification number to the call center when the telematics unit initiates contact with the call center after the next ignition actuation of the vehicle.

5. The system of claim 1, wherein the vehicle subsystem comprises a powertrain.

6. The system of claim 1, wherein the fault indicator comprises malfunction indicator light.

7. A method for alerting a driver to a condition of a vehicle, the vehicle having a vehicle subsystem, a fault detection monitor configured to detect a fault in the vehicle subsystem, and a fault indicator communicatively connected to the fault detection monitor and configured to provide a fault indication to the driver upon a first occurrence of the fault if the fault falls within a first category of faults, and to provide the fault indication to the driver after multiple occurrences of the fault if the fault falls within a second category of faults, the method comprising the steps of:

receiving a fault notification at a telematics unit mounted to the vehicle;

providing the fault notification to a call center, the call center being remotely located from the vehicle;

determining whether the fault indication has been provided to the driver;

initiating communication between the call center and the driver if the fault setting a trigger at the telematics unit if the fault indication has not been provided to the driver, the trigger being configured to prompt the telematics unit to contact the call center upon a next ignition actuation of the vehicle.

8. The method of claim 7, further comprising the steps of: contacting the call center with the telematics unit after the next ignition actuation of the vehicle;

determining whether the fault indication has been provided to the driver after the next ignition actuation of the vehicle; and initiating communication from the call center to the driver if the fault indication has been provided to the driver after the next ignition actuation of the vehicle.

9. The method of claim 8, further comprising the step of cancelling the trigger after the next ignition actuation if the fault indication has not been provided to the driver.

10. The method of claim 7, further comprising the steps of: including an identification number in the trigger that relates to the fault; and providing the identification number to the call center when the telematics unit contacts the call center after the next ignition actuation of the vehicle.

11. The method of claim 7, wherein the step of receiving the fault notification at the telematics unit comprises receiving the fault notification from the fault detection monitor.

12. The method of claim 7, wherein the step of determining whether the fault indication has been provided to the driver comprises the call center querying the fault detection monitor.

* * * * *